E. Fontaine.
Cattle-Car.

No. 76067.  Patented Mar. 31, 1868.

Witnesses.
Theo Insche
W. Fruin

Inventor.
E. Fontaine
Per Munn &
Attorneys

United States Patent Office.

EUGENE FONTAINE, OF FORT WAYNE, INDIANA.

*Letters Patent No. 76,067, dated March 31, 1868.*

IMPROVED CATTLE-CAR.

*The Schedule referred to in these Letters Patent and making part of the same.*

TO ALL WHOM IT MAY CONCERN:

Be it known that I, EUGENE FONTAINE, of Fort Wayne, in the county of Allen, and State of Indiana, have invented a new and improved Cattle-Car; and I do hereby declare that the following is a full, clear, and exact description thereof, which will enable others skilled in the art to make and use the same, reference being had to the accompanying drawings, forming part of this specification.

This invention relates to a new and useful improvement in cattle-cars, whereby the same may be adapted for carrying either large or small animals. At present a car for carrying small animals, such as hogs, sheep, &c., has a horizontal central partition, permanently fixed within the car, so that the latter has two compartments, one above the other, in each of which the small animals may be placed, and the whole of the interior of the car rendered available for transporting such animals; but, in the event of one of these cars being appropriated for carrying large animals, (beeves, for instance,) the central partition or flooring requires to be taken out, at considerable labor and expense, and when required again it is replaced at considerable expense.

My invention consists in providing a cattle-car with a movable partition, arranged or applied in such a manner that it may be raised or lowered, as required, raised up to the roof of the car, entirely out of the way, when large animals are to be carried, and lowered so as to form a central horizontal floor or partition, when small animals are to be carried. In the accompanying sheet of drawings—

Figure 1:
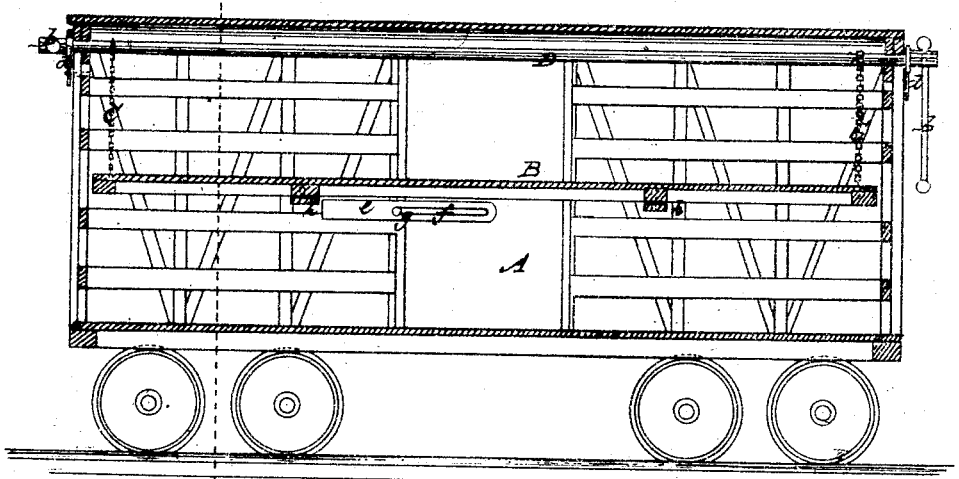

Figure 1 is a longitudinal vertical section of my invention, taken in the line $y\ y$, fig. 1.

Similar letters of reference indicate corresponding parts.

A represents the body of a cattle-car, which may be constructed in the usual or any proper manner, and B is a horizontal partition or platform, which is placed within the car, and is supported at each end by chains, C, which are attached, one to each corner of the platform, and extend up over pulleys $a$, at the sides of the car, and are secured to a shaft, D, which runs longitudinally through the upper part of the car, extending through the ends of the same, and having a handle, $b$, at each end, for the convenience of turning it. This shaft is prevented from turning under the weight of the partition or platform, by means of ratchets $c$, on the shaft, and pawls $d$, on the ends of the car, the pawls catching into the ratchets.

To the inner surface of each side of the car there is secured a slotted bar, $e$, and these serve to support the partition or platform B, when the latter is let down to about the centre of the car, as shown in fig. 1. These bars have oblong slots $f$ in them, through which the bolts $g$ pass, which secure them to the car, the slots admitting of the bars being moved longitudinally, in a horizontal direction, out of the way of the doors, when the partition or platform is raised, and large animals are to pass through the doors.

Figure 2:
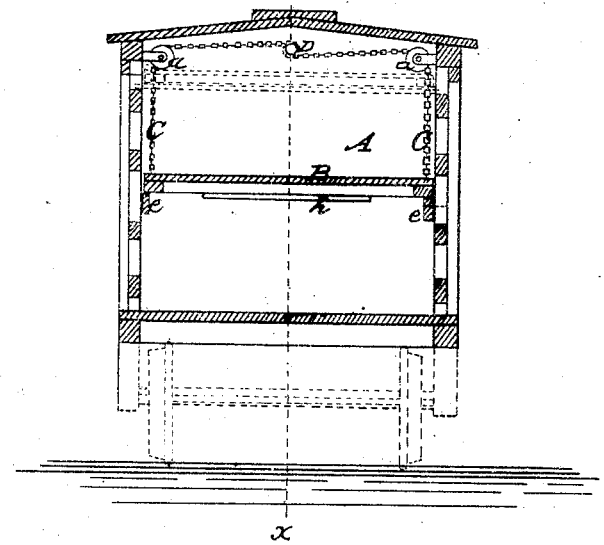

When the partition or platform is raised, as shown in red in fig. 2, bars $h$, which are pivoted to the under side of the platform or partition, are turned in a direction transverse with the car-body, and their ends made to rest on the upper slats of the car-body, said bars $h$ serving to support the platform or partition, as shown in red in fig. 2.

Thus, by this simple arrangement, the car may, by a very simple adjustment of the platform, B, be adapted for carrying large or small animals.

Having thus described my invention, I claim as new, and desire to secure by Letters Patent—

1. The adjustable platform B, in combination with the pivoted bars $h$, for supporting said platform in the top of the car, and with the slotted horizontal arm $e$, for holding the same in position when lowered to the centre of the car, as herein shown and described.

2. The platform B, having the pivoted bars $h$, when adjusted by means of the single longitudinal shaft D and the chains C, as herein described, for the purpose specified.

EUGENE FONTAINE.

Witnesses:
WM. F. MCNAMARA,
ALEX. F. ROBERTS.